Oct. 4, 1955  G. GRAVIER  2,719,764
ANTIFRICTION BEARINGS
Filed July 13, 1954  2 Sheets-Sheet 1
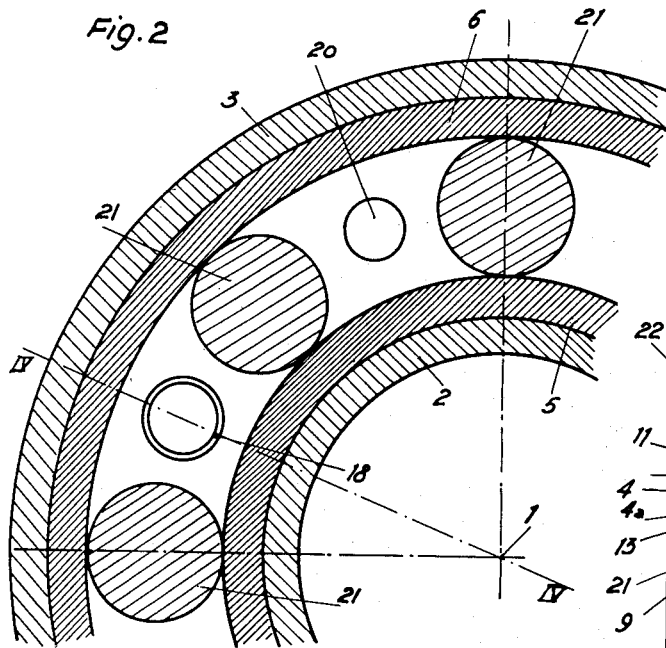
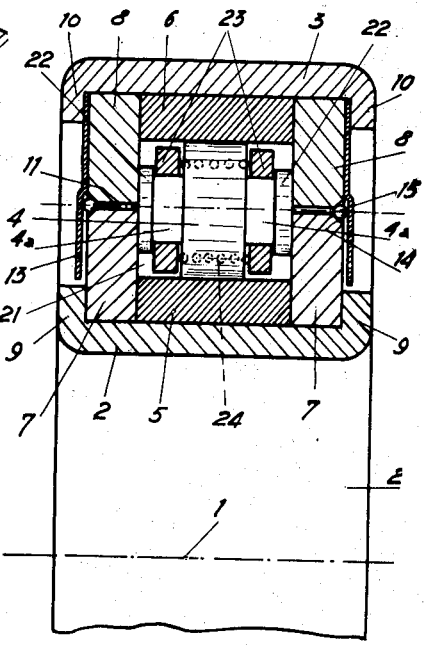
Fig. 2
Fig. 3
Fig. 1
Inventor
George Gravier
by his attorneys
Chitty, Parmelee + Strickland Oct. 4, 1955
G. GRAVIER
2,719,764
ANTIFRICTION BEARINGS
Filed July 13, 1954
2 Sheets-Sheet 2
Fig. 4
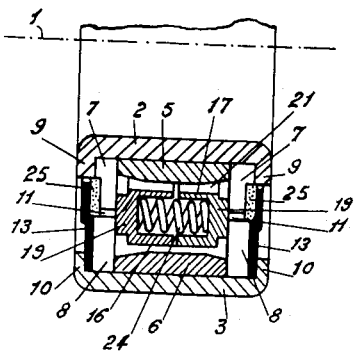
Fig. 5
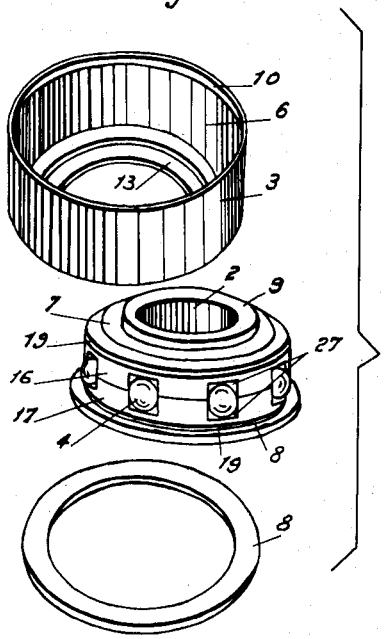
Fig. 8
Fig. 6
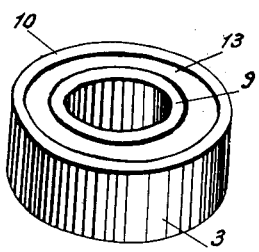
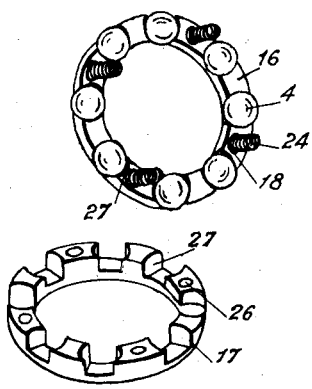
Fig. 7
Inventor
Georges Gravier
by his attorneys
Christy, Parmelee, Strickland United States Patent Office 2,719,764
Patented Oct. 4, 1955

2,719,764

ANTIFRICTION BEARINGS

Georges Gravier, Paris, France

Application July 13, 1954, Serial No. 443,118

Claims priority, application France January 7, 1954

9 Claims. (Cl. 308—187.2)

The present invention relates to fluid-tight antifriction bearings comprising rolling elements which may be either rollers or balls.

One object of the present invention is to provide a bearing assemblage of very simple parts capable of economical production and adapted for reliably preventing escape of lubricant on the one hand and entry of dirt and foreign matter on the other hand.

A further object is to attain internal sealing of the bearing by means of a divided cage comprising annular parts under the influence of springs tending to separate them and cause them to make endwise sealing pressure against abutment rings mounted within the bearing casing.

Yet another object is to provide for the external sealing of the bearing by means of annular screens supported peripherally of the bearing, these annular screens being advantageously used in conjunction with packing rings disposed on the ends of the bearing and inwardly of the said screens.

These and other objects and advantages will appear from the following detailed description with reference to annexed drawing.

Practical constructions embodying the invention are illustrated by way of example in the accompanying drawings wherein:

Figure 1 is a central vertical section through the upper part of a bearing assembly.

Figure 2 is a fragmentary section of the line II—II of Figure 1.

Figure 3 is a view similar to Figure 1, showing a modification.

Figure 4 is a view similar to Figure 1, but on an smaller scale, the view in this case being of the lower part of a bearing assembly according to a further modification and the section being taken on a line similar to that marked IV—IV in Figure 2.

Figure 5 is an exploded perspective view of the bearing in Figure 4 in a partially assembled condition.

Figure 6 is a perspective view of a half cage containing the rolling elements of Figure 4.

Figure 7 is similar to Figure 6, but showing the complementary half cage, and

Figure 8 is a perspective view of the completed bearing illustrated in Figures 4 to 7.

In the drawings, the bearing has an axis of revolution 1 and comprises, in known manner, a casing composed of a hub part 2 and an external cylindrical part 3. The bearing elements 4 (rollers or balls; rollers being shown in Figure 1) are located between the two casing parts 2 and 3, the said bearing elements rolling on and in races 5 and 6 which are respectively fretted, shrunk or tightly mounted on the hub part 2 and in the external part 3. The positions of these races are defined laterally by pairs of concentric abutment rings 7 and 8 which are held between the races and flanges 9 and 10 formed on the casing parts 2 and 3, respectively. A very small clearance 11 is provided between members of a pair of rings 7 and 8, this clearance forming a ring which coincides with an imaginary ring containing the axes 12 around which the bearing elements 4 individually roll. Externally of the side plates 7 and 8 are protective annular screens 13 having their peripheral edges clamped between the side plates 8 and the flanges 10, but which extend inwardly only so far as to leave a slight clearance between themselves and the flanges 9. In Figure 1, the abutment rings 7 and 8 are bevelled to provide seatings 14 in the vicinity of the clearances 11, which seatings are adapted to receive packing rings 15 of any suitable material for the purpose of completing the fluid tightness and for preventing dust or other foreign matter from penetrating into the spaces 11.

In the modification seen in Figure 4, similar parts are indicated by the same references as are used in Figure 1. In this modification, however, the packing rings 15 of Figure 1 are replaced by flat packing rings 25 of cork or the like. The rings 7 are formed with flat recesses to seat the cork rings 25 and the latter are retained in such seatings by the annular screens 13 which have their peripheral edges clamped between the flanges 10 and the rings 8, as before.

A cage for the rolling elements 4 is made of two cylindrical parts 16 and 17 (Figures 1, 2 and 4 to 7). Each cage part is formed with seatings 27 for the bearing elements 4. It is to be noted that the bearing elements 4 are shown as balls in Figures 5 and 6 and as rollers in Figures 1 to 3. Springs 24 (Figures 3, 4 and 6) are interposed between the cage parts, the ends of such springs being received in suitable seatings 18 and 26 (Figures 2, 6 and 7). The springs 24 act on the said cage parts 16 and 17 in such manner that projecting annular end surface parts 19 (Figures 1, 4 and 5) are applied against the abutment rings 7 and 8 to hermetically seal the spaces 11. The concentricity of the cage parts is effected either by a suitable number of studs, which are shown at 20 in Figure 2, or simply by the penetration of the springs 24 into the seatings, namely 18 in the one cage part 16, and 26 in the other cage part 17 (Figures 6 and 7). If desired, one cage part may be adapted for the fixing therein of one end of the springs 24, the other end of the latter extending freely into corresponding recesses in the other cage part.

The modification shown in Figure 3 is more particularly applicable to a roller bearing. In this case, the cage is formed by four elements instead of two and comprises two side washer rings 22 and two cage rings 23. The rings 23 are urged by springs 24 against the washers 22 which ensures the fluid tightness by sealing the spaces 11. The rollers 4 in this case are formed with end journals 4a of smaller diameter which are seated in bores formed in the rings 23. The ends of the journals 4a may also engage in circular recesses formed in the inner surfaces of the washer rings 22.

The assembly of the bearing is carried out as follows: an unflanged external casing part 3 receives the bearing race 6 which is tightly fixed therein. To one side of the race 6 there is a ring 8 and a screen 13 and the end of the casing part at this side is formed with a flange 10. The bearing race 5 is fixedly mounted on the hub part 2 which at this time is unflanged, an abutment ring 7 is placed on the hub and kept in place by forming a flange 9 on the hub part. The halves of the cage 16 and 17 containing the bearing elements 4 and springs are then assembled. This assembly is introduced into the external casing part 3 and over a hub part 2. The second abutment ring 7 is then passed on to the hub part 2 and the second flange 9 is formed. Firstly, the second abutment ring 8 and the second screen 13 are then fitted, and the second flange 10 of the part 3 is formed. The bearing then has the appearance which is shown in Figure 8.

In all cases, the devices according to the invention enable the space 21 in which the bearing elements 4 are located to be made completely fluid-tight; this space may then be suitably lubricated without loss of lubricant and without introduction of dust or foreign matter coming from outside, even if the bearing is employed in a machine subjected to very hard and very dirty working conditions, for example, in a transporter or conveyor for minerals or the like.

In the case where the bearing is a roller bearing, these rollers are preferably journalled at each end, as in the example shown in Figure 3.

It is to be understood that the examples which have been described and illustrated have only been given by way of example and may be subjected to various modifications of detail without departing from the scope of the invention as defined by the claims.

I claim:

1. In an anti-friction bearing, in combination spaced concentric cylindrical members having opposing flanges at each side thereof, inner and outer bearing races mounted in said concentric members, a bearing cage formed of two half sections disposed between said races and having bearing members therein engaging the races, a pair of spaced concentric ring members at each side of the cage enclosing the races, a plurality of springs disposed between the halves of the bearing cage pressing each cage half into bearing engagement with the sides of the ring members adjacent the opening therebetween said concentric ring members being engaged by the opposing flanges of the concentric cylindrical members to form the bearing, the space between the concentric ring members providing for admission of lubricant to the bearing members.

2. The anti-friction bearing member as in claim 1 having an annular screen seated between one of the flanges of the cylindrical member and the adjacent concentric ring member at each side of the bearing and extending across the adjacent opening between the concentric ring members.

3. The anti-friction bearing member as in claim 2 having packing rings seated in the space between said concentric rings to seal the lubricant openings.

4. The anti-friction bearing member as in claim 2 in which the other of the concentric ring members at each side of the bearings is offset inwardly from the adjacent flange of the cylindrical member to receive the packing ring which extends across the lubricant opening between the concentric rings to seal the opening and are held in place between adjacent annular screen.

5. The anti-friction bearing as in claim 1 in which the opposing faces of the cage halves have suitable openings for the support of the bearing members and springs.

6. The anti-friction bearing as in claim 1 in which the opposing faces of the cage halves are provided with openings for reception of studs for preserving the concentric assembly of the cage parts.

7. The anti-friction bearing as in claim 1 in which one cage half has suitable apertures within which the springs are secured and the opposing face of the other cage half is provided with registered openings within which the free ends of the springs are inserted.

8. In an anti-friction bearing, in combination spaced concentric cylindrical members having opposing flanges at each side thereof, inner and outer bearing races mounted in said concentric members, a bearing cage formed of two half sections disposed between said races, each said bearing cage half having opposing annularly arranged apertures therein, roller bearings disposed between the cage halves and provided with reduced end portions extending through the adjacent apertures of the cage halves, a plurality of springs disposed between said cage halves for resiliently urging them apart, a pair of spaced concentric rings at each side of the cage enclosing the races and retained in engagement therewith by the opposing flanges of the concentric cylindrical members, and end plate members at each side of the bearing cage supported upon the roller bearing extending end portions for closing the space between the adjacent concentric ring members.

9. The anti-friction bearing as in claim 8 in which the bearing cage springs resiliently press the plate members against the concentric rings to seal the space therebetween.

References Cited in the file of this patent

UNITED STATES PATENTS

| 1,302,825 | Meier | May 6, 1919 |
| 2,112,754 | Annen | Mar. 29, 1938 |

FOREIGN PATENTS

| 507,359 | France | Sept. 14, 1930 |